United States Patent [19]

Ellersick

[11] 4,159,411

[45] Jun. 26, 1979

[54] PORTABLE RADIANT HEATING APPARATUS

[76] Inventor: Russell R. Ellersick, 7925 Twin Oaks Dr., Citrus Heights, Calif. 95610

[21] Appl. No.: 722,791

[22] Filed: Sep. 13, 1976

[51] Int. Cl.$^2$ .................. H05B 1/00; F21V 29/00
[52] U.S. Cl. ..................... 219/346; 128/395;
219/85 BA; 219/220; 219/230; 219/347;
219/349; 219/351; 219/524; 219/533; 362/294
[58] Field of Search ..................... 219/339–343,
219/346–358, 377, 220, 230, 228, 535, 533, 524,
525, 405, 411, 85 BA, 85 BM; 128/395–399;
34/96–99, 243 R; 362/345, 346, 285, 287, 294

[56] References Cited

U.S. PATENT DOCUMENTS

| | | | |
|---|---|---|---|
| 2,426,976 | 9/1947 | Taulman | 219/525 |
| 2,447,960 | 8/1948 | Ricketts et al. | 219/525 |
| 2,533,947 | 12/1950 | Lipnicki et al. | 219/525 |
| 3,240,915 | 3/1966 | Carter et al. | 219/405 X |
| 3,475,592 | 10/1969 | Berkl | 219/535 X |
| 3,515,853 | 6/1970 | McAdams | 219/358 X |
| 3,689,737 | 9/1972 | Eckles et al. | 219/346 |
| 3,792,230 | 2/1974 | Ray | 219/343 |

FOREIGN PATENT DOCUMENTS

722808   2/1955   United Kingdom ................. 219/346

*Primary Examiner*—A. Bartis
*Attorney, Agent, or Firm*—Mark C. Jacobs

[57] ABSTRACT

A portable radiant heating apparatus includes a pair of linearly extending members pivotally attached to one another adjacent a first end thereof and pivotal about the pivotal attachment to be generally parallel to one another. A lamp receiving electrical socket supported on the other end of each of the members receives a high intensity infrared lamp electrically arranged to receive power from its socket via means for connecting each of the sockets to an electrical power source. A concave infrared reflective shield is provided about each of the lamps and shaped to direct the light from each of the lamps generally uni-directionally. Thermal insulation means are also provided to protect the members and shields from the heat generated by the lamps.

18 Claims, 4 Drawing Figures

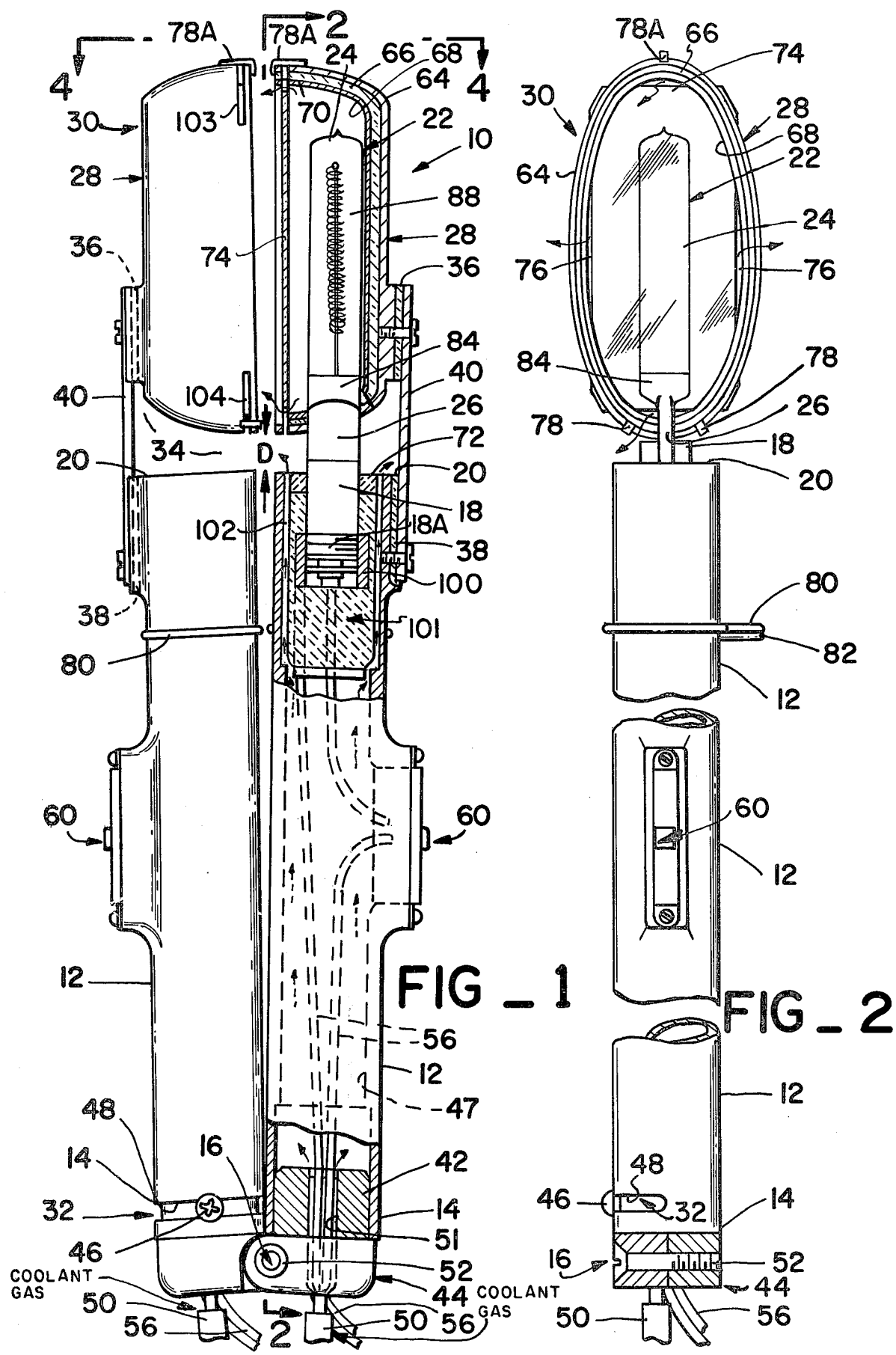

U.S. Patent Jun. 26, 1979 Sheet 2 of 2 4,159,411
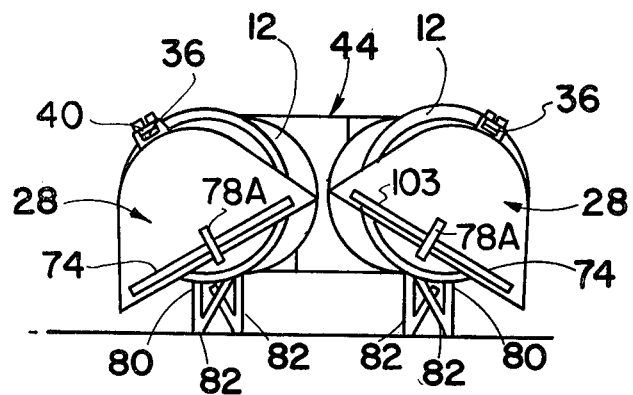
FIG_4
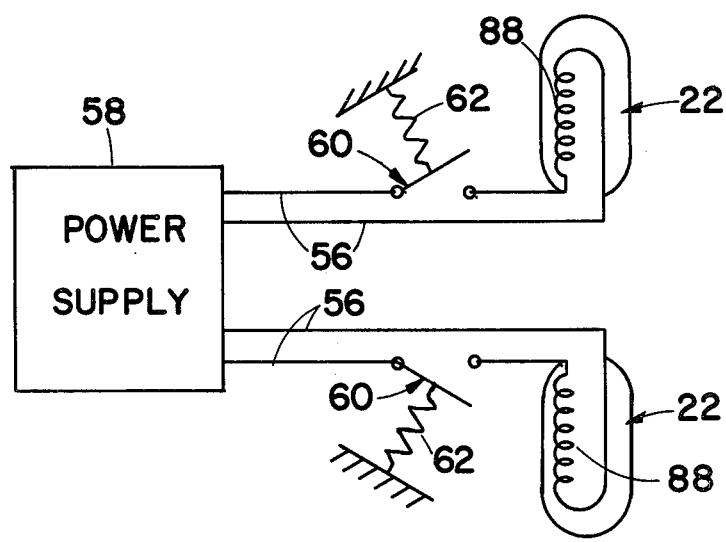
FIG_3

PORTABLE RADIANT HEATING APPARATUS

BACKGROUND OF THE INVENTION

1. Field of the Invention

The invention is concerned with the field of infrared radiant heating. Such heating may be utilized for a number of purposes including but not limited to shrink fitting of parts, soldering and the like. Somewhat more particularly, the invention is directed to a particular apparatus for carrying out fast acting radiant heating.

2. Prior Art

The prior art discloses any number of means for accomplishing conductive and radiant heating. In the field of conductive heating, for example, U.S. Pat. No. 1,422,826 discloses electrically heated tongs, which can be closed about a part to heat it. Radiant heating of parts is taught for example in U.S. Pat. No. 3,515,853 which is concerned with a heating tool having a pair of aligned, semi-cylindrical subheads, each supported at one end of a handle and each subhead containing a plurality of elongated heating elements arranged parallel to the axis of the subheads. The handles are interconnected in a plier-type or sugar-tong type arrangement whereby the subheads can be moved from an open position to a closed position encircling the workpiece to be heated. The subheads may be provided with reflectors to reflect radiation towards the workpiece. U.S. Pat. No. 3,353,005 discloses a brazing furnace which utilizes as the heating source therein high temperature radiating lamps of the infrared generating variety such as quartz iodide lamps. U.S. Pat. No. 3,731,051 discloses apparatus for stress relieving a welded joint between large diameter pipes comprising a plurality of electric heating modules hinged end to end so as to fit chain-like around the circumference of the pipe. Each heater module comprises several quartz bulbs projecting from an air-cooled housing in which the bases of bulbs are supported and a reflector to direct heat from the bulb toward the pipe.

While each of the just discussed patents discloses a useful heating apparatus, none of these references discloses such an apparatus wherein the apparatus is adjustable to fit adequately about many different places to be heated, wherein the light produced by the lamps thereof is generally unidirectional so that it can be maximally utilized to heat a workpiece, wherein the means which causes the light from each of a pair of lamps to be generally unidirectional is sufficiently insulated from the members which support the lamps so that these members do not become overlyheated. The present invention provides an apparatus which in its broadest embodiment accomplishes all of these desired results. The apparatus of the present invention is further, highly adjustable and even disassemblable whereby it can be used in a number of different applications thereby providing great versatility to its use.

SUMMARY OF THE INVENTION

In one sense the invention comprises a fast acting radiant heating apparatus. The apparatus comprises a pair of generally equal length linearly extending members pivotally attached to one another adjacent a first end thereof and pivotal about said pivotal attachment to be generally parallel to one another. The apparatus further comprises a pair of electric sockets, one supported adjacent a second end of each of said members. Also part of the apparatus is means for connecting each of the sockets to an electrical power source. A pair of high infrared intensity lamps having vitreous infrared transparent envelopes, each lamp attached to receive power from one of the sockets and to extend outwardly from a second end of one of the members, forms yet another part of the apparatus. The apparatus also includes a pair of concave infrared reflective shields, one fitting about each of the lamps and shaped to direct the light from each of the lamps to be generally unidirectional, whereby each respective lamp and shield forms a light directing assembly. Means are provided for aligning the light from each of the lamp-reflective shield assemblies to aim generally at the other thereof. Means are provided for attaching each one of the shields a spaced distance from a second end of one of the members and maintaining an air gap between the shield and the second end of the members. Further, solid heat insulation means are provided intermediate the shield attaching means and each second end of each of the members.

BRIEF DESCRIPTION OF THE DRAWINGS

The invention will be better understood by reference to the figures of the drawings wherein like numbers denote like parts throughout and wherein:

FIG. 1 illustrates in side elevation the apparatus of the present invention partially cut away to better illustrate certain features thereof;

FIG. 2 illustrates a view taken generally along the line 2—2 of FIG. 1;

FIG. 3 illustrates schematically the electric circulatory of the apparatus of the present invention;

FIG. 4 illustrates a view taken along line 4—4 of FIG. 1 with rotation of portions of the apparatus.

DETAILED DESCRIPTION OF THE PREFERRED EMBODIMENT

The general structure of the preferred heating apparatus 10 of the present invention is illustrated most thoroughly in FIG. 1. The radiant heating apparatus 10 includes a pair of members 12 each of which is linearly extending and of substantially the same length. The members 12 are pivotally attached to one another adjacent a first end 14 thereof at a pivot 16. The members 12 are pivotal about the pivot 16 to be generally alignable parallel to one another. Each of the members 12 supports an electric socket 101 adjacent a second end 20 of said member 12. A pair of high infrared intensity lamps 22, each having a vitreous infrared transparent envelope 24, is attached to a respective one of the electric sockets 101, in the threaded section thereof to receive power therefrom and extends outwardly from the second end 20 of the member 12. Each of the lamps 22 screws into the electric socket 101 at a base end 18 of said lamp. The base of said lamp 22 has a threaded base 18A below neck 26 of the lamp. Base 18A threads into the threaded section 100 of socket 101. It is seen that envelope 24 is adjacent circular portion 84 of the lamp 22. A thin neck 26 is provided between the circular portion 84 and the base 18 of the lamp. A pair of concave infrared reflective shields 28 each fit about one of the lamps 22 and are shaped concavely to direct the light from each of said lamps 22 to be generally unidirectional. Each of the lamps 22 and the shields 28 together form a light directing assembly 30. It is of course understood that while the light is generally unidirectional and is thus beamed in generally one direction from each of the light directing assemblies 30 that the light is not precisely unidirectional and indeed spreads outwardly somewhat from the light directing assemblies 30.

While in the ordinary course of events each light directing assembly 30 includes a shield 28 and a lamp 22, the lamp 22, especially since it is a prior art item, has been omitted from the left side of FIG. 1 in order not to clutter space 34 and to allow the reader to better recognize the shape of shield 28 and member 12.

Means are generally provided for aligning the light from each one of the assemblies 30 to aim generally at the other assembly 30. In the embodiment of the invention illustrated, these means comprise a pair of slot and bolt fasteners 32, the operation and structure of which will be explained in more detail below. Means are also provided for attaching each one of the shields 28 a spaced distance D from a second end 20 of one of the members 12 and maintaining an air gap 34 between the shields 28 and the second ends 20 of the members 12. Solid heat insulation means, in the embodiment illustrated comprising a first pair of solid heat insulators 36 and a second pair of solid heat insulators 38, are provided intermediate the shield attaching means—in the embodiment illustrated a bar 40—and the second end 20 of the members 12.

Examining now most particularly the structure of the linearly extending members 12, it is noted that in the illustrated embodiment they each comprise a hollow tube and that each of these hollow tubes fits over a boss 42, which generally has a cylindrical shape, of a hinge 44 of which the previously mentioned pivot 16 forms a part. The generally cylindrical shape of the bosses 42 allows the member 12 to be rotated thereabout when a bolt 46 of the slot and bolt fasteners 32 is loosened. When the bolt 46 is loosened it is clear that the member 12 can be pivoted to the extent of a slot 48 of the slot and bolt fasteners 32. The bolt 46 can then be fastened in place with the member 12 rotated as desired relative to the boss 42 of the hinge 44. The hollow interior 47 of the member 12, in the preferred embodiment of the invention, provides a passageway through each of the members 12 from adjacent the first end 14 thereof to adjacent the second end 20 thereof to allow flowing of a coolant fluid, generally a gas such as air or the like, through the members 12. The use of a coolant fluid flowing through the members 12 can be highly desirable especially when the lamps are to be used for a long period of time and hence the members 12 may start to heat up somewhat due to the large amount of infrared energy being generated by the lamps 22. In many uses of the apparatus, however, the heating up will not occur even without the use of a fluid coolant in the members 12. In order to introduce a coolant fluid into each of the members 12, each of the halves of the hinge 44 can be provided, as illustrated, with an entry port 50 and a passageway 51 into which the fluid can be flowed. The fluid will generally flow outwardly about the electric socket 101 and thence escape to the surrounding atmosphere. It is noted in this regard that the socket 101 is thus usually spaced a small distance from the interiors 47 of the members 12. It is also noted in this regard, that the passageways formed by the interiors 47 of the members 12, thus communicate with socket 18 to provide cooling thereof at the same time.

The hinge 44 is generally of the disassemblable variety as by the removal of a bolt 52 which fastens the two sides of the hinge 44 together. It will be noted that the bolt 52 when it is in place serves as part of the pivot 16. Thus the first ends 14 of the members 12 are detachable from each other through removal of the bolt 52. It should further be noted that each of the bosses 42 of the hinge 44 generally has a second bore therein through which an electric cord 56 which communicates with a power supply 58 which may be of either the AC or the DC variety when the preferred lamps 22 as described below are used. It is thus noted that when the bolt 52 is removed from the hinge 44 one acquires two separately useful portions of the apparatus 10. It should also be noted that independent switching means, in the embodiment illustrated comprising the pair of switches 60, one in each of the members 12, are provided in each of the pair of electric cords 56. This allows the independent switching on and off of each one of the lamps 22. It is further to be noted that each of the switches 60 is supported by one of the members 12 and spaced generally an equal distance intermediate the first end 14 thereof and the second end 20 thereof. This ensures that an operator can activate both of the switches 60 using a single hand, for example, by using a thumb to operate one of the switches and a finger to operate the other. The switches 60, as will be noted particularly by reference to FIG. 3, are generally of the normally biased open variety. This is schematically illustrated in FIG. 3 by showing a pair of tension springs 62 each acting to hold in the open circuit position one of the switches 60. Thus, a safety feature is provided whereby upon release of the switches 60 the circuit will assume an open circuit configuration and the lamps 22 will not be lit.

Each of the shields 28 is detachable from each of the members 12 so that the lamps 22 can be used to provide a multi-directional light source when needed. This might be necessary, for example, if one desired to heat up a cavity into which one of the lamps 22 could be inserted, whereby the multidirectional light source would be desirable. Each of the reflective shields 28 generally includes a rigid metallic support 64 which in the preferred embodiment is convexly shaped, but which may be differently shaped if so desired, and an insulator 66 intermediate the support 64 and one of the lamps 22. The shields 28, further include a reflecting material 68 which covers a side 70 of the insulator 66, which side 70 faces the lamp 22. The reflective material 68 provides a reflector surface which preferably has a generally minimal absorption coefficient for light of the wave length produced by the lamps 22. In this manner, heating of the support 64 is minimized. The solid insulators 36 and 38, which hold the bar 40 away from direct metallic contact with both the support 64 and the member 12, further prevent conduction of heat to the members 12. The apparatus 10 further preferably includes a solid heat insulator 72 which serves to protect the socket 18 and is located between each of the sockets 18 and one of the air gaps 34.

As previously indicated, bulb base 18 threads into socket threads 100. Socket 101 is loosely fitted within the diameter of the metal portion of 12 thereby avoiding the necessity of a specific air flow passage. This is seen in the figure as noted space 102.

Each of the shields 28 preferably includes an infrared transparent vitreous protective plate 74 attached thereto and spaced intermediate one of the lamps 22 and a target aligned to receive generally unidirectional light emitted thereby. Means are generally provided about the respective plates 74 and more particularly between the plates 74 and the shields 28 to allow air therebetween to circulate away from each one of the lamps 22. In the embodiments illustrated, the air circulating means comprise a pair of cooling gaps 76 about the periphery of the plates 74.

The plates 74 can be held in place by any number of means. In the embodiment illustrated they are held in place by a pair of pins 78, with one pair of pins being used for each of the plates 74 on the bottom, and a single pin 78A on the top for each plate 74. Plates 74 have their four corners chamfered in order to comply better with the contours of the shields 22 and to prevent injury. Plate 74 is inserted into shield 28 by sliding the plate downwardly through top slits 103 to aligned slits 104 at the bottom of shield 28. The top and bottom slits are equally spaced apart horizontally and vertically. Plate 74 is sized in thickness slightly less than the depth of the slits 103 and 104. To ensure that plate 74 is retained in place "F" shaped pins 78A and 78 are frictionally engaged above and below plate 74 in the slots 103 and 104 to retain plate 74 therein. Removal of pin 78A allows plate 74 to be slid upwardly for removal and replacement. In case of damage, the plates 74 can be easily removed by simply removing the pin, sliding the plate outwardly and replacing it with another plate and then finally replacing the pin. Generally, the plates 74 and the envelopes 24 of the lamps 22 are made of the same type of vitreous material. Generally such vitreous material will be quartz because of its very low infrared absorption coefficient. Other vitreous materials, for example, such commercial glasses as Vycor, any of several borosilicate or aluminosilicate glasses, etc. may be substituted for the quartz if they have a sufficiently high melting point and if they have a sufficiently low infrared absorption coefficient.

In the embodiment of the invention illustrated, means are provided adjacent the second ends 20 of each of the members 12 for supporting said second ends 20 above the surface. In the particular embodiment illustrated, the support means comprise a pair of supports 80 each attached to one of the members 12 adjacent to the second end 20 thereof. The particular supports illustrated comprise simple pressure clamps and each have a pair of legs 82 for contact with a surface. It is clear that each of these supports 80 as illustrated are rotatable about the longitudinal axis of one of the members 12, whereby no matter what direction the light directing assemblies 30 are aimed, the supports 80 can be rotated so as to hold the second ends 20 of the members 12 above a surface.

The apparatus of the present invention preferably utilizes what is commonly known as a quartz iodide lamp. Such a lamp comprises an envelope 24 made of quartz and the lamp has therein a resistively heated tungsten filament 88. Such a lamp is preferred to a gas discharge lamp since it can operate well for long periods of time, will produce a great deal of infrared radiation thus providing a great deal of available radiant heat per kilowatt hour utilized and is equally usable in AC and DC power systems. Such a lamp 22 generally has an iodide therewithin to aid in keeping the tungsten filament from dissipating during use. The iodide is believed to aid in causing the tungsten to redeposit upon the filament rather than scattering the tungsten about the interior of the lamp as it is cooled.

While the discussion above refers many times to one lamp, one socket, one shield and the like, this was done for ease of understanding, since both halves of the device are essentially mirror images of each other.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A fast acting radiant heating apparatus, comprising a pair of generally equal length linearly extending members pivotally attached to one another adjacent a first end thereof by a pivotal attachment means and pivotable about said pivotal attachment to be generally parallel to one another;
   an electric socket, capable of receiving one lamp, supported on the second end of each of said members;
   means for connecting each of said sockets to an electric power source;
   a high intensity infrared lamp having a vitreous infrared transparent envelope, attached in each of said said sockets to receive power therefrom and to extend longitudinally outwardly from said second end of the member;
   a concave infrared reflective shield fitted about each one of said lamps and shaped to direct the light from each of said lamps to be generally unidirectional, each lamp and shield forming a light directing assembly means;
   means for attaching each one of said shields to a respective one of said members a spaced distance from a second end thereof to provide a thermally insulating air gap between each shield and the respective second end of said members.

2. An apparatus as in claim 1, including:
   means permitting rotation of each of said members about a respective longitudinal axis thereof, said means being associated with the pivotal attachment means pivotally 3. An apparatus as in claim 1, including:
   means for detaching the pivotally attached said first ends of said members from one another; and
   independent switch means in said power source connecting means for independently switching on each respective one of said lamps.

4. An apparatus as in claim 3, wherein said switch means are biased into an open circuit position and return to said open circuit position when not activated into a closed circuit position by an operator.

5. An apparatus as in claim 4, wherein said switch means comprises a pair of switches each mounted on a respective one of said members and spaced generally an equal distance intermediate said first and second ends thereof so that an operator can activate both of said switches using a single hand.

6. An apparatus as in claim 3, wherein said shields are detachable from said members so that said lamps are usable to provide a multidirectional light source.

7. An apparatus as in claim 1, including an infrared transparent vitreous protective plate attached to each of said shields and spaced intermediate said lamps and a target aligned to receive the generally unidirectional light emitted thereby and means between each shield and each plate for air to circulate away from each lamp.

8. An apparatus as in claim 7, wherein said protective plates and said lamp envelopes are each formulated of the same type of vitreous material.

9. An apparatus as in claim 8, wherein said vitreous material comprises quartz.

10. An improvement as in claim 8, wherein each of said envelopes comprise quartz and said lamps have therein a resistively heated tungsten filament and iodide.

11. An apparatus as in claim 1, wherein each of said reflective shields includes a reflective surface which has a generally minimal absorption coefficient for light of the wavelengths being produced by said lamps.

12. An apparatus as in claim 1, wherein each of said members includes a passageway therethrough from adjacent the first to the second end thereof to allow flowing of a coolant fluid therethrough.

13. An apparatus as in claim 12, wherein said passageway communicates with the socket to provide cooling thereof.

14. An apparatus as in claim 1, including: means adjacent said second ends of said members for supporting said second ends of said members above a surface.

15. An apparatus as in claim 14, wherein said supporting means comprises support means, attached to each of said members, each of said support means being rotatable about the longitudinal axis of said respective one of said members.

16. An apparatus as in claim 1, including a socket protecting solid heat insulator between each of said sockets and a respective one of said air gaps.

17. An apparatus as in claim 1, wherein said reflective shields each include:
a rigid metallic support
an insulator intermediate said support and said lamp; and
reflecting material covering a lamp facing side of said insulator.

18. The heating apparatus of claim 1 further including solid heat insulation means intermediate said shield attaching means and the second end of each of said members.

* * * * *